Dec. 7, 1965  J. E. MacKAY  3,222,533
WINDMILL GENERATOR
Filed Aug. 1, 1963  4 Sheets-Sheet 1

INVENTOR
James E. MacKay

Dec. 7, 1965     J. E. MacKAY     3,222,533
WINDMILL GENERATOR
Filed Aug. 1, 1963     4 Sheets-Sheet 2

INVENTOR.
James E. MacKay

Dec. 7, 1965  J. E. MacKAY  3,222,533
WINDMILL GENERATOR

Filed Aug. 1, 1963  4 Sheets-Sheet 3

INVENTOR
JAMES E. MACKAY

BY R. L. Westell

PATENT AGENT

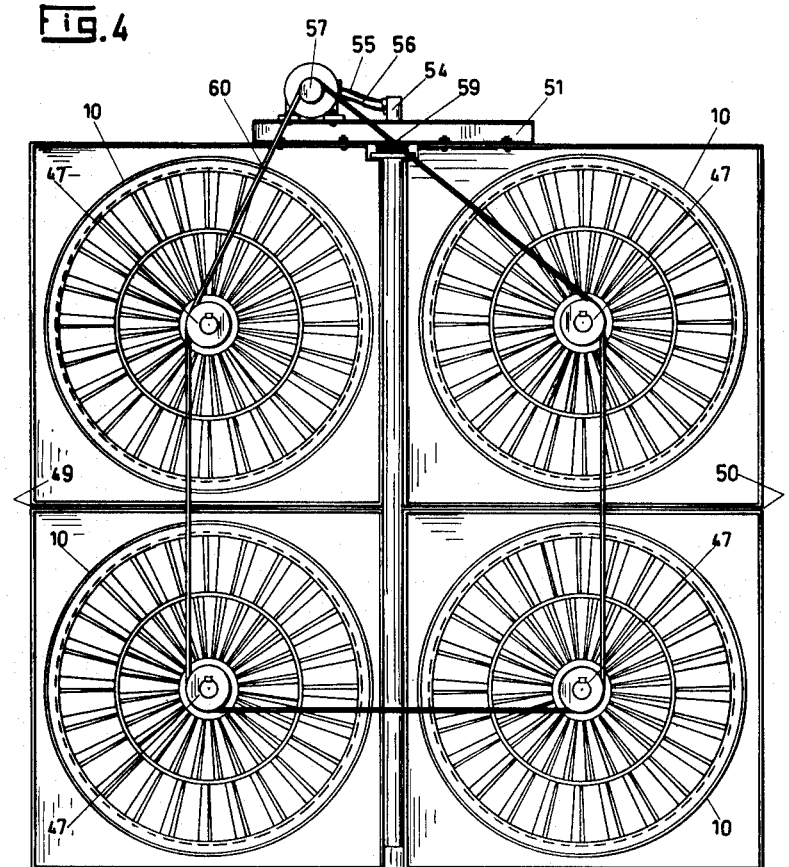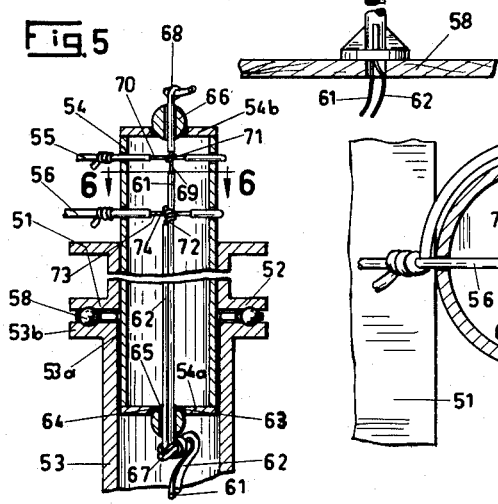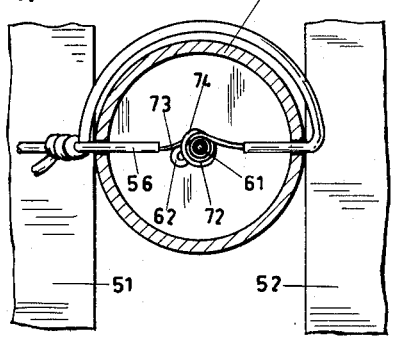
INVENTOR.
James E. MacKay

United States Patent Office 3,222,533
Patented Dec. 7, 1965

3,222,533
WINDMILL GENERATOR
James E. MacKay, 308 The Kingsway,
Toronto, Ontario, Canada
Filed Aug. 1, 1963, Ser. No. 305,581
3 Claims. (Cl. 290—55)

This application is a continuation-in-part of my application Serial Number 160,443 filed December 19, 1961 and now abandoned.

This invention relates to improvements in windmills, and more particularly to improvements in windmills utilized as prime movers in the generation of electric power.

The conversion of wind power to electric power through the medium of windmills is well known in the art. However, windmills of the prior art rely on blade lengths to convert sufficient wind power to usable electric power and, to this end, very large, propellor type blading is used. The main objection to this type of blading is that the variation in peripheral speed between the hub and the tip of the propellors makes it necessary to vary the weathering angle throughout the length of each blade, this being a complex manufacturing method and increases the cost of the blading to a great extent. It is also evident that a large amount of the blade surface does not operate at its maximum efficiency, it also being necessary to taper the blade tips thereby reducing their effective area and, furthermore, it is also necessary to strengthen the blade roots which also destroys their effective wind driven area.

It is an object of the present invention to provide a windmill having maximum possible amount of effective blade area contained in the minimum amount of space.

It is another object of this invention to provide a windmill in which the blading is sub-divided, permitting the smaller diameter blading to revolve at a greater speed than the larger diameter blading so that each section of blading produces its maximum amount of work, the speeds of each section of blading being reconciled through epicyclical gearing to drive a common shaft.

It is a further object of this invention to provide a windmill which may be easily adapted to assembly in multiple units.

It is yet another object of this invention to provide a windmill utilizing a chain method in the outer ring gears in order to reduce costs.

It is yet another object of this invention to provide a windmill which, by the use of curved stator blades, applies wind pressure at the correct angle to the faces of the blades thereby obtaining the maximum benefit from wind pressure especially upon such pressure being light or moderate.

These and other objects of this invention will become apparent when taken in conjunction with the accompanying drawings in which:

FIGURE 4 is a front view of the plurality of windmill units as illustrated in FIGURE 1 showing a method by which they may be harnessed to drive a common generator.

FIGURE 5 is a sectional side elevation of the upper end of a support member illustrated in FIGURE 4, showing particularly the method by which electric power from the generator is transferred to a rotating connection through the centre support shaft.

FIGURE 6 is a partly cut-away sectional and elevation of the mechanism illustrated in FIGURE 5, taken on the line 6—6.

Figure 1:
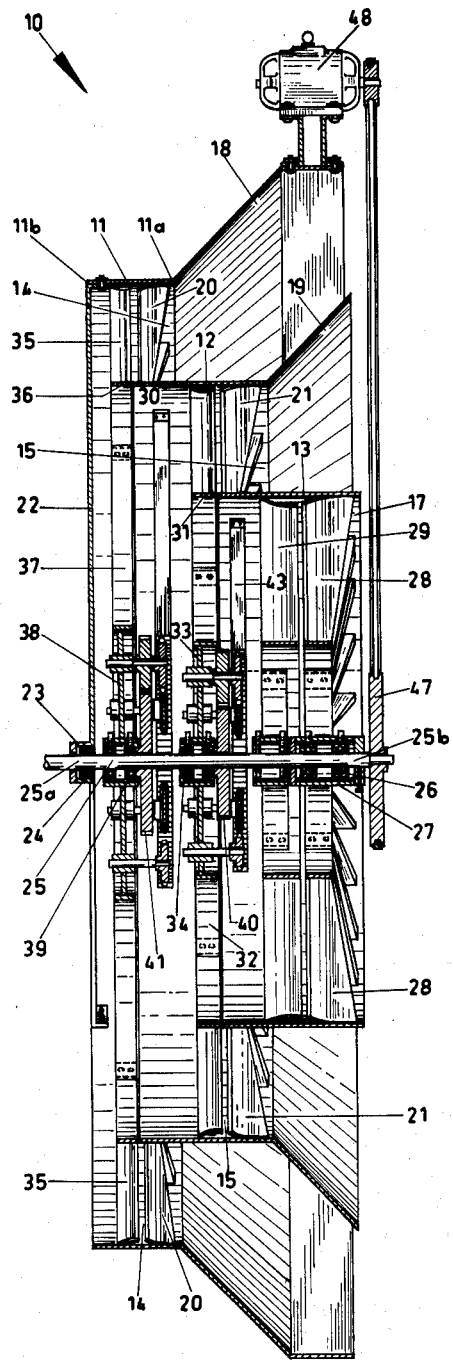
FIGURE 1 is a sectional side elevation of a windmill unit embodying the present invention.
Figure 2:
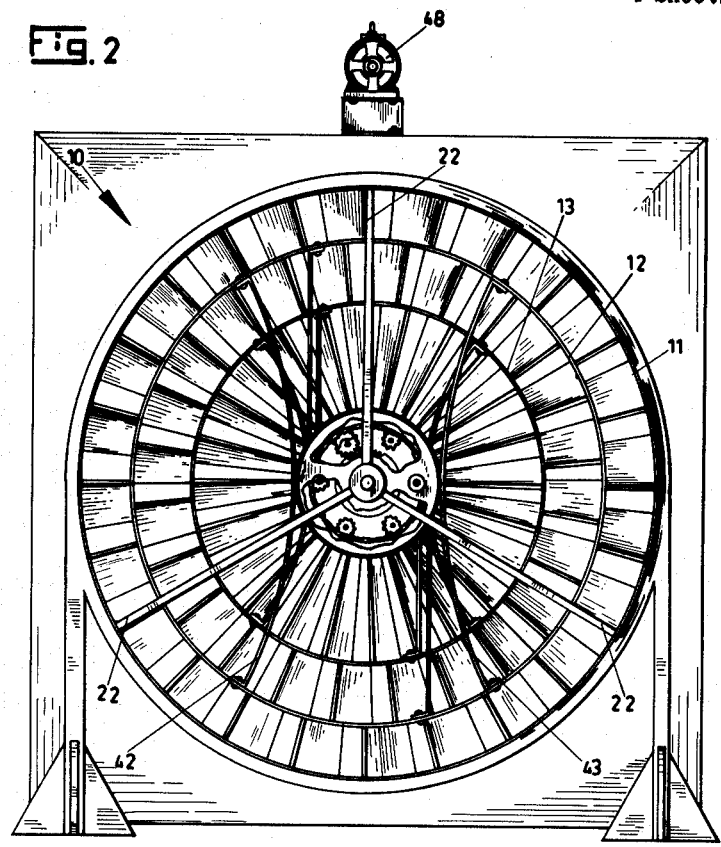
FIGURE 2 is a rear view of the windmill unit illustrated in FIGURE 1 partly cut-away to show the epicyclic gearing thereof.

Referring to FIGURES 1 and 2, a windmill unit 10 comprises three open ended, concentric, cylindrical casings 11, 12 and 13 spaced apart to form an annular chamber 14 between casings 11 and 12, a similar annular chamber 15 between casings 12 and 13 and a cylindrical chamber 17 formed by the interior of inner casing 13. Casings 11, 12 and 13 are arranged telescopically, inner casing 13 being the most forward.

The forward edge 11a of casing 11 extends forwardly and outwardly to form a frusto-conical duct 18 while a similar duct 19 extends forwardly from centre casing 12 the forward edges of ducts 18 and 19 being substantially coplanar with the forward edge of inner cylinder casing 13.

A ring of stator blades 20 occupy the forward portion of annular chamber 14, blades 20 being adapted to interconnect outer casing 11 and centre case 12 and to both locate and support centre case 12 with respect to outer case 11.

A similar set of stator blades 21 are located in the forward portion of annular chamber 15 between centre case 12 and inner case 13 and are adapted to both support and locate case 13 with respect to case 12.

A plurality of radially inwardly extending arms 22 are attached to outer case 11 adjacent the rear edge 11b thereof, arms 22 terminating substantially centrally of case 11 to support a shaft bearing housing 23. A bearing 24 located within housing 23 rotatably supports and locates the rearmost end 25a of a centre shaft 25.

The forward end 25b of shaft 25 is supported in bearings 26 contained within a cylindrical housing 27, housing 27 forming a root end support for a third set of stator blades 28 which extend radially outwardly therefrom to occupy the forward portion of cylindrical chamber 17 and to have their tips integral with the inner surface of inner cylindrical case 13.

A set of inner vanes 29 extend radially outwardly from shaft 25 to occupy inner cylindrical chamber 17 immediately to the rear of stator blades 28. Vanes 29 are keyed to shaft 25 or attached in some other manner for rotation therewith and sufficient clearance exists between the outer tips thereof and casing 13 and between the forward edge thereof and stator blades 28 to permit the free rotation of vanes 29 within chamber 17.

The rear portion of annular chamber 15 is occupied by a plurality of vanes 30 which extend radially outwardly from a support ring 31 of substantially the same diameter as cylindrical casing 13, ring 31 being supported by a plurality of spokes 32 extending radially inwardly therefrom to a centre disc 33 or other rotatably mounted rotor member which is adapted to rotate freely on shaft 25 by the use of centre bearings 34. Bearings 34, it should be noted, permit vanes 30 to rotate independently of shaft 25.

A rear set of vanes 35 occupy the rear portion of annular chamber 14 being supported by a ring 36 of substantially the same diameter as cylindrical case 12, a plurality of spokes 37 extending inwardly from ring 36 to a centre disc 38 which is also freely supported on shaft 25 by means of a bearing assembly 39.

It will be noted that shaft 25 is driven directly by the innermost vanes 29. It should further be noted that vanes 29, 30 and 35 are of substantially the same frontal area and, therefore, their peripheral speeds are substantially the same but, being of varying diameters, the smaller sets of vanes will have a higher angular speed, vanes 29 being the fastest turning. It is, therefore, essential that the speed of rotation of vanes 30 and 35 be increased upon transference of power therefrom to shaft 25 and, to this end, an epicyclic gear assembly 40 and a similar epicyclic gear assembly 41 are adapted to operate in conjunction with vane assemblies 30 and 35 respectively.

To this end, gear assembly 40 only will be described, gear assembly 41 varying only in the necessary gear ratios in order to allow for varying speeds of vanes 35 from that of vanes 31.

Figure 3:
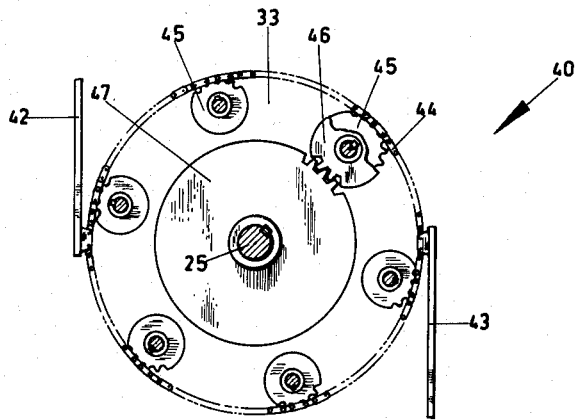
FIGURE 3 is a front view of the epicyclic gearing illustrated in FIGURE 2.

Referring particularly to FIGURES 2 and 3, two tangential support struts 42 and 43 extend chord-wise across cylindrical casing 13 and support oppositely located portions of a chain member 44 which, upon assuming a circular configuration, is adapted to be substantially concentric with shaft 25, struts 42 and 43 being adapted to be substantially tangential thereto under these conditions. Chain 44 is maintained in a substantially circular configuration by means of a plurality of sprockets 45 rotatably supported by disc 33. A gear 46 is coaxial with one of said sprockets 45 and is adapted to drive a centre gear 47 which, in turn, is keyed to shaft 25. In this manner, rotation of vanes 30 being transmitted through spokes 32 to disc 33 causes sprockets 45 to move in circular path and, being engaged with chain 44, also to rotate about their axis and thus, in the conventional manner, the speed of disc 33 when transferred through sprocket 45 and gear 46 to gear 47 imparts a rotational speed to shaft 25 approximately equal to that already imparted thereto by the rotation of the inner vanes 29.

As previously stated the maximum operating speed of vanes 35 is similarly reconciled with the higher speed of shaft 25 through gearing 41 so that it will be evident that the three sets of vanes 29, 30 and 35 as herein described while rotating at their maximum efficient speed are all approximately equally instrumental in driving shaft 25 in a manner utilizing the maximum amount of energy to its best advantage.

Figure 3A:
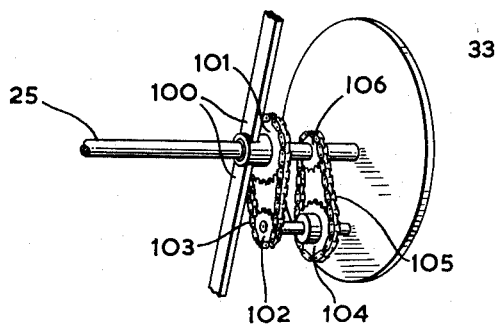
FIGURE 3a is a front view of an alternative form of epicyclic drive.

In FIGURE 3a is shown an epicyclic coupling between the disc 33 or other equivalent member and shaft 25 which is alternative to that shown in FIGURE 3. Here struts 100 are connected to casing 31 and to a gear 101 which gear to mount the latter is concentric about and rotatably mounted relative to shaft 25. A gear 102 is rotatably mounted on disc 33 spaced from gear 101 and the gears 101 and 102 are joined by a sprocket chain 103. A gear 104 is attached to and coaxial with gear 102 for rotation therewith. The gears may be directly attached and freely rotatable on a shaft fixed to disc 33, or may be both keyed to a common shaft rotatable in disc 33. Gear 104 is coupled by sprocket chain 105 to a gear 106 mounted on and keyed to rotate with shaft 25. Thus as disc 33 is driven by vanes 30, the axis of gear 102 is rotated about shaft 25 while gear 101 remains fixed in position relative to casing 31. The gear 102 thus rotates relative to casing 31 at a rate determined by the tooth ratio of gears 101 to 102 and the speed of rotation of disc 33. The rotation of gear 102 is applied to shaft 25 in accord with the ratio of teeth in gears 104 and 106. The gear ratio of gear 101 to gear 102 and gear 104 to gear 106 are selected so that the shaft 25 is driven by vanes 30 at a speed approximately equal to that already imparted thereto by the rotation of inner vanes 29.

In a similar manner and with properly selected gear ratios, vanes 35 may be similarly coupled to shaft 25.

It will be noted, that with the sprocket chain coupling shown, that vanes 30 and 35 driving the shaft 25 indirectly, will rotate in an opposite direction to vanes 29 driving the shaft 25 directly. The efficiency of the device should not be substantially reduced on this account, but if it is desired that all vane rotations shall be in the same direction, then a gear drive may be interposed between gear 102 and gear 104 to reverse the rotation of the latter. Alternatively, all vane rotations may be made to take place in the same direction by using a chain drive between one pair of gears, preferably 104 and 106 but removing the chain between the other pair of gears and designing the latter gears to undermesh with the correct ratio, thus obtaining the required reversal of rotational direction.

In general it is believed that the epicyclic drive using a sprocket chain will be more convenient than the epicyclic gear drive previously described for outer sets of vanes where the planetary shaft is located a large distance radially from shaft 25. Moreover, while with both types of drive, the gear ratios must be correctly selected, with the epicyclic gearing of FIGURE 3 the gear sizes must also be correctly selected to achieve proper intermeshing of the gears. Thus the arrangement of FIGURE 3a will allow more flexibility of design in many cases.

Bearing the problem of the epicyclic gear drive in mind it will be understood that if desired one of the drives i.e. from casing 31 to the shaft rotatable on disc 33 may be of one type (either chain or gear) while the drive from the shaft rotatable on disc 33 to shaft 25 may be of the other type.

In FIGURE 1, a pulley 47 mounted on the front end of shaft 25 and keyed or splined thereto is adapted to drive a generator 48 conveniently mounted on duct 18.

It should be noted that all stator blades 20, 21 and 28 are curved to deflect the wind entering the front of unit 10 onto the vanes 35, 30 and 29 respectively, the said vanes also being curved in order to derive the maximum amount of power from the wind supplied.

Referring to FIGURES 4, 5 and 6, a preferred method of harnessing a number of windmill units 10 is illustrated. In this case, a battery of four units 10, their outer ducts 18 terminating in square forward ends, are joined in vertical pairs 49 and 50. The latter are then rigidly joined by means of two parallel girders 51 and 52 adapted to be bolted or the like to the upper surfaces of the pairs of units 49 and 50. Bars 51 and 52 also hold pairs of units 49 and 50 sufficiently spaced apart to permit them to be fitted over a vertical, tubular centre post 53 and located thereon by means of a tubular pivot member 54.

Member 54 is centrally located between bars 51 and 52 and at right angles thereto. It extends below the lower surfaces of bars 51 and 52 to become slidably inserted in the open upper end 53a of centre post 53, and it also extends above bars 51 and 52 to receive two electrical cables 55 and 56 from a generator 57 mounted on girders 51 and 52.

Centre post 53 is rigidly attached to a base 58 and a ball bearing assembly 59 is located between the flanged upper edge 53b of centre post 53 and the undersurfaces of girders 51 and 52 to permit relatively friction-free rotation of windmill units 49 and 50 upon centre post 53. Any suitable turning device, either manual or automatic, may then be utilized to rotate units 49 and 50 into wind in order to derive the maximum benefit therefrom.

Generator 57 is driven by a pulley belt 60 adapted to harness the power available at the pulleys 47 of the component units 10.

FIGURES 5 and 6 illustrate a preferred simple method of transferring the generated current from cables 55 and 56, which rotate with units 49 and 50, to two stationary pick-up cables 61 and 62 respectively.

Cables 61 and 62 pass diametrically through a ball 63 which in turn is accommodated in a spherical seating 64 defining the edges of a hole 65 formed through the lower end disc 54a of tubular member 54, cable 61 continuing axially through member 54 to pass through upper end disc 54b and a similar ball 66. A knot 67 is formed in cables 61 and 62 below lower ball 63 and cable 61 has a similar knot 68 formed therein above upper ball 66. In this manner, balls 63 and 66 are retained on their seatings and together with cables 61 and 62 remain stationary during any rotation of member 54.

An upper portion 69 of cable 61 is stripped of its insulation and cable 55 is adapted to pass diametrically through member 54, a portion 70 thereof also being stripped of its insulation and held in electrical contact with stripped portion 69 of cable 61 both geometrically and with the aid of a pressure tie 71.

The upper end 72 of cable 62 is stripped and wrapped around the insulated covering of cable 61 within member 54 and thereafter soldered or the like to maintain a smooth, clean external surface.

A bared portion 73 of generator cable 56 is adapted to contact wrapped upper end 72 of cable 62 in a manner similar to that described for cable 55, and a pressure tie 74 similarly assists in maintaining good electrical contact between cables 56 and 62.

Cables 61 and 62, of course, may be utilized to transfer the generated power to storage batteries, motors or the like as required.

The general design of the individual parts of the invention as explained above may be varied accordingly to requirements in regards to manufacture and production thereof, while still remaining within the spirit and principle of the invention, without prejudicing the novelty thereof.

I claim:

1. A windmill operating on the turbine principle, including a plurality of open ended cylindrical casings in concentric conformation, having annular chambers formed therebetween, the centremost defining a cylindrical chamber; a plurality of first stator blades in the forward portions of each of said annular chambers, extending radially between said casings; a plurality of second stator blades extending radially inwardly of said cylindrical chambers and rigidly connected to said casings; a bearing housing rigidly connected to the inner ends of said second stator blades; said bearing housing defining a rotary axis concentric with said casings and located at the forward end of said windmill; a centre shaft extending between and rotatably supported by said bearing housing and said rear bearing; a plurality of first vanes extending radially outwardly from said centre shaft into said cylindrical chamber rearwardly of said second stator blades; rotor means rotatably mounted on a rear bearing coaxial with said bearing housing, rigidly connected to said casings, said centre shaft rearwardly of said first vanes; a plurality of second vanes extending radially and mounted on said rotor means, rearwardly of said first stator blades in each of said annular chambers; epicyclic drive means, connecting each of said rotor members to said driving centre shaft whereby the latter is driven by said second vanes at substantially the same rotational speed as said first vanes; and means for connecting the said centre shaft to electric generator means.

2. A windmill as defined in claim 1 in which said epicyclic drive includes a substitute petition and static support means therefor; a sprocket engageable with said chain; drive gear means integral with said sprocket; driven gear means integral with said centre shaft; and said drive and driven gears being in meshed engagement.

3. A plurality of windmills as defined in claim 1 joined together by girder means to form a windmill unit; centre post means for the rotational support of said windmill units; tubular means retained by said girders slidably inserted in the upper end of said centre post; bearing means interposed between said girders and said centre post; generator means mounted on said girders; means for driving said generator from each of said plurality of windmills; and means for transferring electrical power from said generator to stationary cables.

References Cited by the Examiner

UNITED STATES PATENTS

| 1,462,151 | 7/1923 | Seymour | 230—123 |
| 1,637,398 | 8/1927 | Syracusa | 170—165 |
| 1,773,340 | 8/1930 | Bell. | |
| 1,998,778 | 4/1935 | Gregg. | |
| 2,153,523 | 4/1939 | Roberts et al. | 170—165 |
| 2,183,195 | 12/1939 | Kane | 170—165 |
| 2,418,801 | 4/1947 | Baumann | 230—123 |

ORIS L. RADER, *Primary Examiner.*